United States Patent
Koskinen et al.

(10) Patent No.: US 9,949,162 B2
(45) Date of Patent: *Apr. 17, 2018

(54) REPORTING FOR MBMS

(71) Applicant: Nokia Solutions and Networks Oy, Espoo (FI)

(72) Inventors: Henri Markus Koskinen, Epsoo (FI); Antti Anton Toskala, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/344,782

(22) Filed: Nov. 7, 2016

(65) Prior Publication Data

US 2017/0055173 A1    Feb. 23, 2017

Related U.S. Application Data

(63) Continuation of application No. 14/374,551, filed as application No. PCT/EP2012/051110 on Jan. 25, 2012, now Pat. No. 9,544,805.

(51) Int. Cl.
  *H04W 4/06* (2009.01)
  *H04W 24/10* (2009.01)
  *H04W 72/00* (2009.01)
  *H04L 12/18* (2006.01)

(52) U.S. Cl.
  CPC .......... *H04W 24/10* (2013.01); *H04L 12/189* (2013.01); *H04W 4/06* (2013.01); *H04W 72/005* (2013.01)

(58) Field of Classification Search
  CPC ............. H04W 24/10; H04W 36/0083; H04W 72/005; H04W 76/002
  See application file for complete search history.

(56) References Cited

U.S. PATENT DOCUMENTS

| | | | |
|---|---|---|---|
| 2005/0090261 A1* | 4/2005 | Agin | H04W 52/16 455/442 |
| 2008/0267109 A1 | 10/2008 | Wang et al. | 370/312 |
| 2009/0245155 A1* | 10/2009 | Fukunaga | H04W 72/005 370/312 |
| 2010/0272004 A1* | 10/2010 | Maeda | H04L 5/0007 370/312 |
| 2011/0244869 A1 | 10/2011 | Olofsson | 455/442 |

(Continued)

OTHER PUBLICATIONS

3GPP TSG RAN WG2 ad-hoc on LTE, Cannes, France, Jun. 27-30, 2006, R2-061985, "MBMS Modulation and Coding State Selection", Motorola, 6 pgs.

(Continued)

*Primary Examiner* — Scott M Sciacca
(74) *Attorney, Agent, or Firm* — Harrington & Smith

(57) ABSTRACT

The invention relates to an apparatus including at least one processor and at least one memory including a computer program code, the at least one memory and the computer program code configured to, with the at least one processor, cause the apparatus at least to: obtain information concerning signal quality, obtain information on location of a cell in relation to a multimedia service area, wherein the information concerning signal quality is created, and control utilizing the information concerning signal quality in a network based on the information on the location of a the cell in relation to the multimedia service area.

16 Claims, 2 Drawing Sheets

(56) References Cited

U.S. PATENT DOCUMENTS

Figure 1:
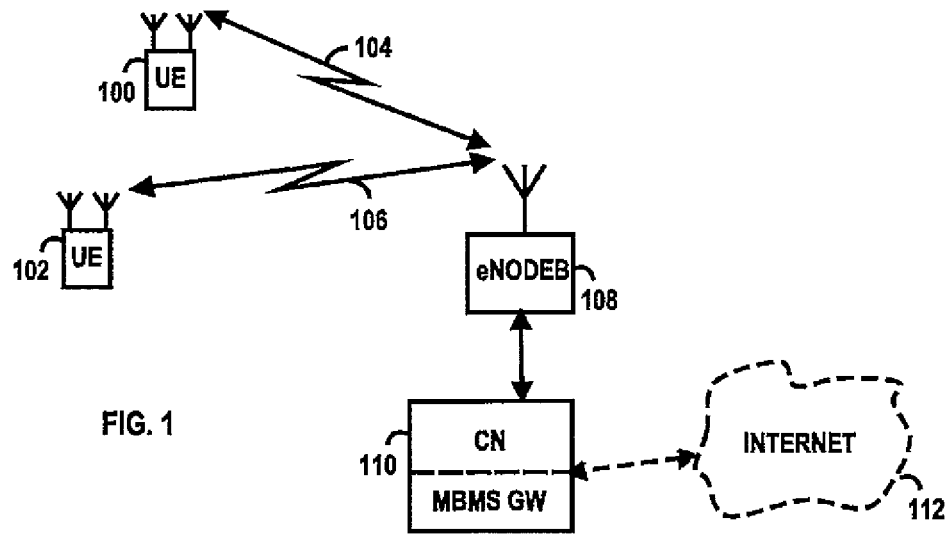

| | | | |
|---|---|---|---|
| 2011/0269449 A1 | 11/2011 | Kazmi | 455/422.1 |
| 2012/0088533 A1* | 4/2012 | Khoshnevis | H04L 1/0026 |
| | | | 455/509 |
| 2012/0155307 A1 | 6/2012 | Turk | 370/252 |
| 2012/0176953 A1* | 7/2012 | Chao | H04L 65/1069 |
| | | | 370/312 |
| 2012/0202493 A1 | 8/2012 | Wang | 455/435.1 |
| 2013/0003695 A1 | 1/2013 | Nylander | 370/331 |
| 2013/0010624 A1 | 1/2013 | He | 370/252 |
| 2013/0044668 A1 | 2/2013 | Purnadi | 370/312 |
| 2013/0084910 A1 | 4/2013 | Suzuki | 455/515 |
| 2014/0029586 A1 | 1/2014 | Loehr | 370/336 |
| 2014/0228032 A1* | 8/2014 | Jung | H04W 8/02 |
| | | | 455/436 |
| 2014/0341104 A1 | 11/2014 | Zhao | 370/312 |

OTHER PUBLICATIONS

TSG-RAN Working Group2#56bis, Jan. 15-19, 2006, Sorrento, Italy, R2-070075, "Discussion of eMBMS Uplink Feedback Schemes", NEC, 5 pgs.

3GPP TS 26.346 V10.2.0 (Nov. 2011), "$3^{rd}$ Generation Partnership Project; Technical specification Group Services and System Aspects; Multimedia Broadcast/Multicast Service (MBMS); Protocols and codecs (Release 10)", 152 pgs.

ETSI TS 136 214 V10.1.0 (Apr. 2011), "LTE: Evolved Universal Terrestrial Radio Access (E-UTRA); Physical layer; Measurements (3GPP TS 36.214 version 10.1.0 Release 10)", 15 pgs.

ETSI TS 136 331 V10.4.0 (Jan. 2012), "LTE; Evolved Universal Terrestrial Radio Access (E-UTRA); Radio Resource Control (RRC); Protocol specification (3GPP TS 36.331 Version 10.4.0 Release 10)", 30 pgs.

* cited by examiner

REPORTING FOR MBMS

This application is a Continuation Application of co-pending U.S. patent application Ser. No. 14/374,551 filed on Jul. 25, 2014, which is the national phase of International (PCT) Patent Application No. PCT/EP2012/051110, filed Jan. 25, 2012, published under PCT Article 21(2) in English, the disclosure of which is incorporated herein by reference in its entirety.

FIELD

The invention relates to apparatuses, methods, systems, computer programs, computer program products and computer-readable media.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Multimedia broadcast multicast services (MBMS) is designed to provide support for broadcast and multicast services by using a point-to-multipoint interface. The MBMS is feasible when a large number of users are interested in same content. It is designed for a plurality of applications, such as mobile TV and radio broadcasting, as well as file delivery and emergency alerts.

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: report information concerning quality of a multimedia broadcast multicast service single frequency network signal, and report information on at least one of best neighbour cells.

According to an aspect of the present invention, there is provided an apparatus comprising: at least one processor and at least one memory including a computer program code, the at least one memory and the computer program code configured to, with the at least one processor, cause the apparatus at least to: obtain information concerning signal quality, obtain information on a location of a cell in relation to a multimedia service area, wherein the information concerning signal quality is created, and control utilizing the information concerning signal quality in a network based on the information on the location of a the cell in relation to the multimedia service area.

According to yet another aspect of the present invention, there is provided a method comprising: reporting information concerning quality of a multimedia broadcast multicast service single frequency network signal quality, and reporting information on at least one of best neighbour cells.

According to yet another aspect of the present invention, there is provided a method comprising: obtaining information concerning signal quality; obtaining information on a location of a cell in relation to a multimedia service area, wherein the information concerning signal quality is created, and controlling utilizing the information concerning signal quality in a network based on the information on the location of a the cell in relation to the multimedia service area.

According to yet another aspect of the present invention, there is provided an apparatus comprising: means for reporting information concerning quality of a multimedia broadcast multicast service single frequency network signal quality, and means for reporting information on at least one of best neighbour cells.

According to yet another aspect of the present invention, there is provided an apparatus comprising: means for obtaining information concerning signal quality; obtaining information on a location of a cell in relation to a multimedia service area, wherein the information concerning signal quality is created, and means for controlling utilizing the information concerning signal quality in a network based on the information on the location of a the cell in relation to the multimedia service area.

According to yet another aspect of the present invention, there is provided a computer program embodied on a computer-readable storage medium, the computer program comprising program code for controlling a process to execute a process, the process comprising: reporting information concerning quality of a multimedia broadcast multicast service single frequency network signal quality, and reporting information on at least one of best neighbour cells.

According to yet another aspect of the present invention, there is provided a computer program embodied on a computer-readable storage medium, the computer program comprising program code for controlling a process to execute a process, the process comprising: obtaining information concerning signal quality; obtaining information on a location of a cell in relation to a multimedia service area, wherein the information concerning signal quality is created, and controlling utilizing the information concerning signal quality in a network based on the information on the location of a the cell in relation to the multimedia service area.

LIST OF DRAWINGS

Figure 2:
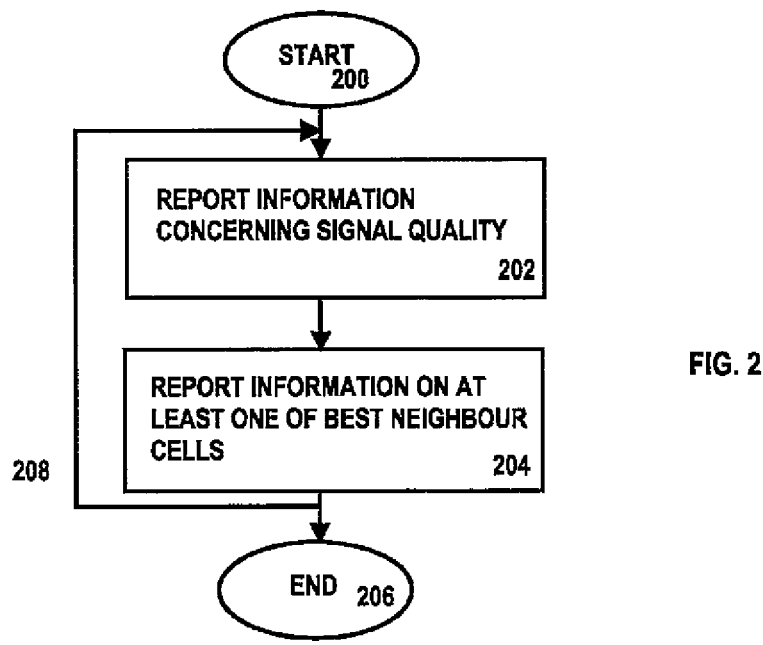
Figure 3:
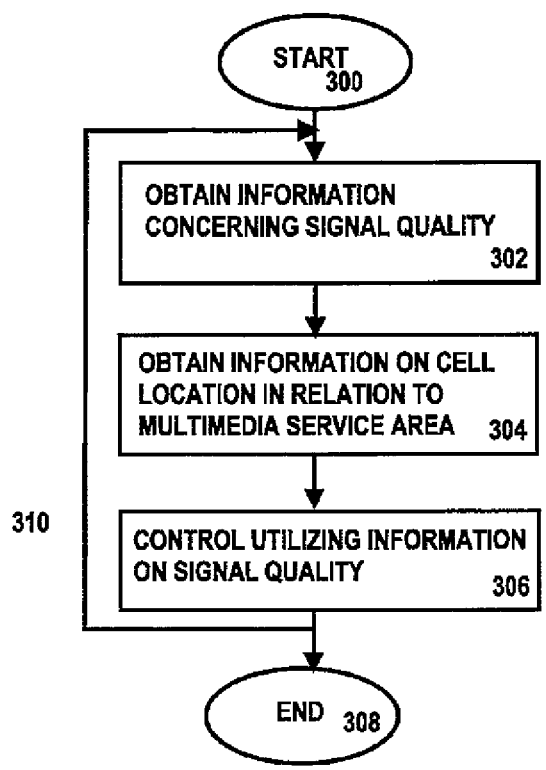
Figure 4:
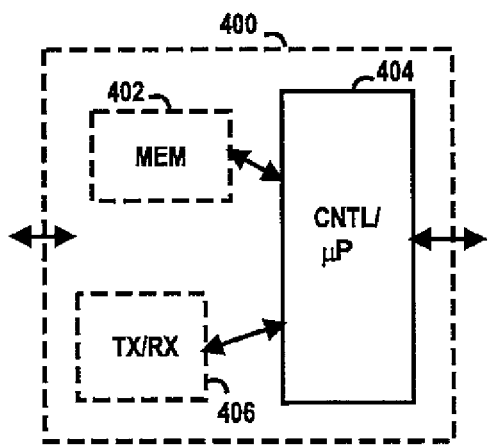
Figure 5:
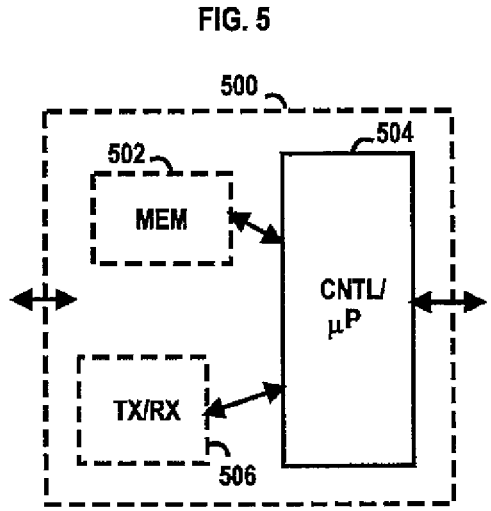

Some embodiments of the present invention are described below, by way of example only, with reference to the accompanying drawings, in which FIG. 1 illustrates an example of a system;
FIG. 2 is a flow chart;
FIG. 3 is another flow chart;
FIG. 4 illustrates examples of apparatuses, and
FIG. 5 illustrates other examples of apparatuses.

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user device, such as a user terminal, as well as to any network element, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A), that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS).

In an orthogonal frequency division multiplexing (OFDM) system, the available spectrum is divided into multiple orthogonal sub-carriers. In OFDM systems, the available bandwidth is divided into narrower sub-carriers and data is transmitted in parallel streams. Each OFDM symbol is a linear combination of signals on each of the subcarriers. Further, each OFDM symbol may be preceded by a cyclic prefix (CP), which is used to decrease Inter-Symbol Interference. Unlike in OFDM, SC-FDMA subcarriers are not independently modulated.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

FIG. 1 shows a part of a radio access network based on E-UTRA, LTE, LTE-Advanced (LTE-A) or LTE/EPC (EPC=evolved packet core, EPC is enhancement of packet switched technology to cope with faster data rates and growth of Internet protocol traffic). E-UTRA is an air interface of Release 8 (UTRA-UMTS terrestrial radio access, UMTS—universal mobile telecommunications system). Some advantages obtainable by LTE (or E-UTRA) are a possibility to use plug and play devices, and Frequency Division Duplex (FDD) and Time Division Duplex (TDD) in the same platform.

FIG. 1 shows user devices 100 and 102 configured to be in a wireless connection on one or more communication channels 104 and 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB, "e" stands for evolved) in LTE-Advanced, is a computing device configured to control the radio resources of communication system it is coupled to. The (e)NodeB may also be referred to as a base station, an access point or any other type of interfacing device including a relay station capable of operating in a wireless environment. Typically, a (e)NodeB needs to know channel quality of each user device and/or the preferred precoding matrices (and/or other multiple input-multiple output (MIMO) specific feedback information, such as channel quantization) over the allocated sub-bands to schedule transmissions to user devices. Such required information is usually signalled to the (e)NodeB.

The (e)NodeB includes transceivers, for example. From the transceivers of the (e)NodeB, a connection is provided to an antenna unit that establishes bi-directional radio links to user devices. The antenna unit may comprise a plurality of antennas or antenna elements. The (e)NodeB is further connected to core network 110 (CN). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

A communications system typically comprises more than one (e)NodeB in which case the (e)NodeBs may also be configured to communicate with one another over links, wired or wireless, designed for the purpose. These links may be used for signalling purposes.

The communication system is also able to communicate with other networks, such as a public switched telephone network or the Internet 112. The communication network may also be able to support the usage of cloud services. It should be appreciated that (e)NodeBs or their functionalities may be implemented by using any node, host, server or access point etc. entity suitable for such a usage.

A user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), plug-in data modem (such as a universal serial bus, USB stick), handset, device using a wireless modem (alarm or measurement device, etc.), laptop and/or touch screen computer, tablet, game console, notebook, and multimedia device.

The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that, in FIG. 1, user devices are depicted to include 2 antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e)NodeBs of FIG. 1 may provide any kind of these cells. A cellular radio system may be implemented as a multilayer network including several kinds of cells. Typically, in multilayer networks, one node B provides one kind of a cell or cells, and thus a plurality of (e) Node Bs are required to provide such a network structure.

Recently for fulfilling the need for improving the deployment and performance of communication systems, the concept of "plug-and-play" (e)Node Bs has been introduced. Typically, a network which is able to use "plug-and-play" (e)NodeBs, includes, in addition to Home (e)Node Bs (H(e) nodeBs), a home node B gateway, or HNB-GW (not shown in FIG. 1). A HNB Gateway (HNB-GW), which is typically installed within an operator's network may aggregate traffic from a large number of HNBs back to a core network.

Multimedia broadcast multicast services (MBMS) is designed to provide support for broadcast and multicast services by using a point-to-multipoint interface. The MBMS is feasible when a large number of users are interested in same content. It is designed for a plurality of applications, such as mobile TV and radio broadcasting, as well as file delivery and emergency alerts. The MBMS comprises MBMS bearer service and MBMS user service. A multicast standard for Long Term Evolution (LTE) is called evolved multimedia broadcast multicast service (eMBMS). In the eMBMS, network resources are allocated for multicasting by "borrowing" them from available spectrum for the duration of the eMBMS session.

Multimedia broadcast multicast service single frequency network (MBSFN) area typically comprises a group of cells coordinated to achieve an MBSFN transmission (a simulcast transmission that transmits same waveforms simultaneously from multiple cells). This coordinated transmission is usually designed to be seen as a single transmission by a user device.

Multimedia broadcast multicast services (MBMS) are designed to be provided by a multimedia broadcast multicast services gateway (MBMS GW) that conveys IP multicast packets to eNBs that are part of the eMBMS service. It is also responsible for MBMS session control signalling towards E-UTRAN using a mobility management entity (MME) functionality. In the FIG. 1, the multimedia broadcast multicast services gateway (MBMS GW) is illustrated as a part of the core network 110. The role of an eNB is to join Internet protocol (IP) multicast, terminate a multicast control channel and indicate the beginning and ending of a multicast session to user devices.

In the following, some embodiments are disclosed in further details in relation to FIGS. 2 and 3. Some embodiments are especially suitable for reporting of broadcast-service reception quality in evolved multimedia broadcast multicast service (eMBMS).

When using eMBMS, signal qualities may be estimated and reported to a network (in a similar manner as other radio related measurements are carried out and reported to the network). However, in collecting measurement information on multimedia broadcast multicast service single frequency network (MBSFN) reception quality from user devices located in different parts of an MBSFN area, a possibility exists to receive measurement information indicating poor reception from user devices located at the edge of the coverage of the MBSFN area. Thus it may be difficult to distinguish whether such reports call for adjusting the content source coding or transmission parameters to more robust ones, or whether such problems are limited to the edge of an MBSFN area. If measurement information originates from the edge of an MBSFN area, it is natural that reception quality is degraded. Hence, optimizing code rates, forward error correction coding (FEC coding), selection of a mobile switching center, and consequently bandwidth utilization based on reports from MBSFN-area edges may cause wrong decisions. Thus, it may be feasible to "filter" out these reports to prevent drawing false conclusions and making wrong decisions in network control.

Embodiments in relation to FIG. 2 may be carried out by a user device.

Embodiment starts in block 200.

In block 202, information concerning quality of a multimedia broadcast multicast service single frequency network signal is reported.

Information concerning signal quality may be different measurement results or based on them, such as signal-to-noise ratio (SNR), signal-to-noise and interference ratio (SNIR), received signal power, received signal strength, and Quality-of Service (QoS). It may also be measurement results as averaged or processed in any other suitable manner. Suitable information may vary according to current radio access protocol. In the case of LTE multimedia broadcast multicast service single frequency network (MBMS), some examples of such information are multimedia broadcast-multicast service single-frequency network reference signal received power (MBSFN RSRP), multimedia broadcast-multicast service single-frequency network reference signal received quality (MBSFN RSRQ), and/or multimedia broadcast-multicast service single-frequency network received signal strength indicator (MBSFN RSSI).

In block 204, information on at least one of best neighbour cells is reported.

The at least one of best neighbour cells may comprise the neighbour cell that the user device receives as the strongest on the frequency of the multimedia service area.

In one embodiment, to enable the entity collecting measurements of MBSFN reception quality to distinguish those measurements which are made in the edge of a MBSFN area, a user device may report the identity of its current primary serving cell and/or the neighbour cell that the user device receives as the strongest on the frequency of the MBSFN area. The information on the primary serving cell may be a ell global identity (CGI). The information on a primary serving cell may be in the form of the currently used radio resource control (RRC) information element (RRC IE). The information on the at least one of best neighbour cells may be a physical cell identity (PCI). However, if the reporting is carried out by using the RRC protocol, a node or server is aware of user devices primary serving cell and thus no need for separate reporting exists.

Other identifiers which a user device may also report are the MBSFN-area identity (ID) of the MBSFN area in question, as well as the service-area ID to which the cell broadcasting the MBSFN area belongs.

A user device may acquire a part of system Information of one or more-neighbour cells autonomously by interrupting reception of one of its serving cells to be used in determining the identity of the best neighbour cell. Another option may be to restrict measurements and/or signalling to be carried out in user device's RRC_Idle state. Alternatively, in the case a primary cell (PCell) Global Cell identity (ID) is available, a physical cell identity (PCI) from a neighbouring cell may be used by a server to identify which measurement data is related to the edge of an MBSFN area. This information may even be derivable from a regular neighbour cell measurement report a user device conveys to a network, or from a part of it.

Additionally, information on how frequently information concerning quality of the MBSFN signal should be reported may be obtained from a serving network.

The embodiment ends in block 206. The embodiment is repeatable in many ways. One example is shown by arrow 208 in FIG. 2.

Another embodiment which may be carried out by a node, host or server will now be explained by means of FIG. 3. The embodiment starts in block 300.

In block 302, information concerning signal quality is obtained.

Information concerning signal quality may be different measurement results or based on them, such as signal-to-noise ratio (SNR), signal-to-noise and interference ratio (SNIR) and Quality-of Service (QoS). It may also be measurement results as averaged or processed in any other suitable manner. Suitable information may vary according to current radio access protocol. The information may be obtained from a user device. In the case of LTE multimedia broadcast multicast service single frequency network (MBMS), some examples of such information are multimedia broadcast-multicast service single-frequency network reference signal received power (MBSFN RSRP), multimedia broadcast-multicast service single-frequency network reference signal received quality (MBSFN RSRQ), and/or multimedia broadcast-multicast service single-frequency network received signal strength indicator (MBSFN RSSI).

The rate of reporting may differ from the one used for reporting existing mobility measurements in the LTE. Therefore, it may be beneficial to control the rate of reporting separately for MBSFN-related quality measurements. Additionally, this allows limiting network signalling load.

In block 304, information on the location of a cell in relation to a multimedia service area, wherein the information concerning signal quality is created, is obtained.

A multimedia service area may be a multimedia broadcast multicast service single frequency network (MBSFN) area which typically comprises a group of cells coordinated to achieve or receive an MBSFN transmission.

Information on the location of a cell may be information on a primary serving cell and/or on at least one of best neighbour cells. The at least one of best neighbour cells may comprise the neighbour cell that the user device receives as the strongest on the frequency of the multimedia service area. It may be used to distinguish information obtained in the edge of a multimedia service area. The information on the primary serving cell may be a cell global identity (CGI). The information on a primary serving cell may be in the form of the currently used radio resource control information element (RRC IE). Term "best neighbor cell" may mean a neighbour cell that the user device receives as the strongest on the frequency of the MBSFN area.

Other identifiers which a user device may also report are the MBSFN-area identity (ID) of the MBSFN area in question, as well as the service-area ID to which the cell broadcasting the MBSFN area belongs.

Alternatively, in the case a primary cell (PCell) global cell identity (ID) is available, a physical cell identity (PCI) from a neighbouring cell may be used by a server to identify which measurement data is related to the edge of an MBSFN area.

In block 306, utilizing the information concerning signal quality in a network is controlled based on the information on the location of the cell in relation to the multimedia service area.

When a node, such as an eNB, is aware which cell are possible border or edge cells of a multimedia service area, it may append such information to service or signal quality information obtained from a user device before relaying it further, or even refrain from relaying such information. The node may even deny devices on a cell edge area to report service or signal quality.

The embodiment ends in block 308. The embodiment is repeatable in many ways. One example is shown by arrow 310 in FIG. 3.

The steps/points, signaling messages and related functions described above in FIGS. 2 and 3 are in no absolute chronological order, and some of the steps/points may be performed simultaneously or in an order differing from the given one. Other functions may also be executed between the steps/points or within the steps/points and other signaling messages sent between the illustrated messages. Some of the steps/points or part of the steps/points can also be left out or replaced by a corresponding step/point or part of the step/point.

It should be understood that conveying, transmitting and/or receiving may herein mean preparing a data conveyance, transmission and/or reception, preparing a message to be conveyed, transmitted and/or received, or physical transmission and/or reception itself, etc. on a case by case basis. The same principle may be applied to terms transmission and reception as well. Additionally, reporting may herein mean preparing a data conveyance, transmission and/or reception, preparing a message to be conveyed, transmitted and/or received, or physical transmission and/or reception itself, etc. on a case by case basis.

An embodiment provides an apparatus which may be any user device or relay node or other suitable device capable to carry out processes described above in relation to FIG. 2.

FIG. 4 illustrates a simplified block diagram of an apparatus according to an embodiment.

As an example of an apparatus according to an embodiment, it is shown apparatus 400, such as user device or web stick, including facilities in control unit 404 (including one or more processors, for example) to carry out functions of embodiments according to FIG. 2. The facilities may be software, hardware or combinations thereof as described in further detail below.

In FIG. 4, block 406 includes parts/units/modules needed for reception and transmission, usually called a radio front end, RF-parts, radio parts, radio head, etc.

Another example of apparatus 400 may include at least one processor 404 and at least one memory 402 including a computer program code, the at least one memory and the computer program code configured to, with the at least one processor, cause the apparatus at least to: report information concerning quality of a multimedia broadcast multicast service single frequency network signal, and report information on at least one of best neighbour cells.

Yet another example of an apparatus comprises means 404 (406) for reporting information concerning quality of a multimedia broadcast multicast service single frequency network signal quality, and means 404 (406) for reporting information on a primary serving cell and on at least one of best neighbour cells.

Yet another example of an apparatus comprises a first reporting unit configured to report information concerning quality of a multimedia broadcast multicast service single frequency network signal quality, and a second reporting unit configured to report information on a primary serving cell and on at least one of best neighbour cells.

It should be appreciated that the first and second reporting units may be stand-alone units, such as separate processors or located in a same unit, in a processor, for example.

It should be understood that the apparatuses may include or be coupled to other units or modules etc., such as radio parts or radio heads, used in or for transmission and/or reception. This is depicted in FIG. 4 as optional block 406.

Although the apparatuses have been depicted as one entity in FIG. 4, different modules and memory may be implemented in one or more physical or logical entities.

An embodiment provides an apparatus which may be any node, host, server, web stick or any other suitable apparatus capable to carry out processes described above in relation to FIG. 3.

FIG. 5 illustrates a simplified block diagram of an apparatus according to an embodiment.

As an example of an apparatus according to an embodiment, it is shown apparatus 500, such as node, base station, server or host, including facilities in control unit 504 (including one or more processors, for example) to carry out functions of embodiments according to FIG. 3. The facilities may be software, hardware or combinations thereof as described in further detail below.

In FIG. 5, block 506 includes parts/units/modules needed for reception and transmission, usually called a radio front end, RF-parts, radio parts, radio head, etc.

Another example of apparatus 500 may include at least one processor 504 and at least one memory 502 including a computer program code, the at least one memory and the computer program code configured to, with the at least one processor, cause the apparatus at least to: obtain information concerning signal quality, obtain information on a location of a cell in relation to a multimedia service area, wherein the information concerning signal quality is created, and control utilizing the information concerning signal quality in a network based on the information on the location of a the cell in relation to the multimedia service area.

Yet another example of an apparatus comprises means 504 (506) for obtaining information concerning signal quality, means 504 (506) for obtaining information on a location of a cell in relation to a multimedia service area, wherein the inforWO mation concerning signal quality is created, and means 504 (506) for controlling utilizing the information concerning signal quality in a network based on the information on the location of a the cell in relation to the multimedia service area.

Yet another example of an apparatus comprises a first obtainer configured to obtain information concerning signal quality, a second obtainer configured to obtain information on a location of a cell in relation to a multimedia service area, wherein the information concerning signal quality is created, and a controller configured to control utilizing the information concerning signal quality in a network based on the information on the location of a the cell in relation to the multimedia service area.

It should be appreciated that the first and second obtainer may be stand-alone units, such as separate processors or located in a same unit, in a processor, for example.

It should be understood that the apparatuses may include or be coupled to other units or modules etc., such as radio parts or radio heads, used in or for transmission and/or reception. This is depicted in FIG. 5 as optional block 506.

Although the apparatuses have been depicted as one entity in FIG. 5, different modules and memory may be implemented in one or more physical or logical entities.

An apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be at least one software application, module, or unit configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. Computer programs may be coded by a programming language, which may be a high-level programming language, such as objective-C, C, C++, C#, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a nontransitory medium.

Other embodiments provide computer programs embodied on a computer readable storage medium, configured to control a processor to perform embodiments of the methods described above. The computer readable storage medium may be a nontransitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a nontransitory medium.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
   at least one processor and at least one memory including a computer program code, the at least one memory and the computer program code configured to, with the at least one processor, cause the apparatus at least to:
   obtain from a user device information concerning signal quality;
   obtain from the user device information on a location of a cell in relation to a multimedia broadcast single frequency network area wherein the information concerning signal quality was created;
   based on the information on the location of the cell, control how the information concerning signal quality is utilized by the apparatus; and
   based on the controlling, report information concerning quality of a multimedia broadcast multicast service single frequency network signal in the multimedia broadcast single frequency network area, and
   report information on at least one of best neighbour cells that the user device receives a strongest signal on a frequency of the multimedia broadcast single frequency network area.

2. The apparatus of claim 1, wherein the information concerning the signal quality is on a primary serving cell associated with the multimedia broadcast single frequency network area.

3. The apparatus of claim 2,
   wherein the obtained information on the location of the primary serving cell comprises at least one of a cell global identity and a physical cell identity of the primary serving cell.

4. The apparatus of claim 2,
   wherein the information on the primary serving cell is obtained using a radio resource control information element.

5. The apparatus of claim 1, wherein the information on the location of the cell in relation to the multimedia broadcast single frequency network area is indicating the location as being a border or edge of the multimedia broadcast single frequency network area.

6. The apparatus of claim 5, wherein based on the location being a border or edge area of the multimedia broadcast single frequency network area, the controlling comprises:
   appending the information on the location of cell to the information concerning the quality of a multimedia broadcast multicast service single frequency network signal before reporting the information, and
   denying devices on the border or edge area to report information concerning signal quality.

7. The apparatus of claim 1, further comprising causing the apparatus to:
   report at least one of the following: multimedia broadcast multicast service single frequency network identity and service area identity.

8. The apparatus of claim 1, further comprising causing the apparatus to:
   obtain information on a rate of reporting the information concerning quality of the multimedia broadcast multicast service single frequency network signal.

9. A method comprising:
   obtaining, by an apparatus, from a user device information concerning signal quality;
   obtaining from the user device information on a location of a cell in relation to a multimedia broadcast single frequency network area wherein the information concerning signal quality was created;
   based on the information on the location of the cell, controlling how the information concerning signal quality is utilized by the apparatus; and
   based on the controlling, reporting information concerning quality of a multimedia broadcast multicast service single frequency network signal quality, and
   reporting information on at least one of best neighbour cells that the user device receives a strongest signal on a frequency of the multimedia broadcast single frequency network area.

10. The method of claim 9, wherein the information concerning the signal quality is on a primary serving cell associated with the multimedia broadcast single frequency network area.

11. The method of claim 10, wherein the obtained information on the location of the primary serving cell comprises at least one of a cell global identity and a physical cell identity of the primary serving cell.

12. The method of claim 11,
    wherein the information on the primary serving cell is obtained using a radio resource control information element.

13. The method of claim 9, wherein the information on the location of the cell in relation to the multimedia broadcast single frequency network area is indicating the location as being a border or edge of the multimedia broadcast single frequency network area.

14. The method of claim 13, wherein based on the location being a border or edge area of the multimedia broadcast single frequency network area, the controlling comprises:
- appending the information on the location of cell to the information concerning the quality of a multimedia broadcast multicast service single frequency network signal before reporting the information, and
- denying devices on the border or edge area to report information concerning signal quality.

15. The method of claim 9, further comprising:
reporting at least one of the following: multimedia broadcast multicast service single frequency network identity and service area identity.

16. The method of claim 9, further comprising:
obtaining information on a rate of reporting the information concerning quality of the multimedia broadcast multicast service single frequency network signal.

* * * * *